Oct. 3, 1967   R. F. HOLM   3,344,903
LIVE ROLLER CONVEYOR

Filed April 27, 1964   2 Sheets-Sheet 1

INVENTOR
ROY F. HOLM
BY
ATTORNEY

Oct. 3, 1967   R. F. HOLM   3,344,903
LIVE ROLLER CONVEYOR
Filed April 27, 1964   2 Sheets-Sheet 2

INVENTOR
ROY F. HOLM
BY *John E. Stryker*
ATTORNEY

United States Patent Office 3,344,903
Patented Oct. 3, 1967

3,344,903
LIVE ROLLER CONVEYOR
Roy F. Holm, St. Paul, Minn., assignor to Standard Conveyor Company, North St. Paul, Minn., a corporation of Minnesota
Filed Apr. 27, 1964, Ser. No. 362,850
3 Claims. (Cl. 198—127)

This invention relates to live roller conveyors of the type whereby the articles to be conveyed are carried on a multiplicity of load supporting rollers which are rotated by frictional engagement with a power-driven endless belt, and the belt is supported in driving engagement with the peripheries of the load supporting rollers by actuator rollers. A conveyor of this type is described in Patent No. 1,903,732, dated Apr. 11, 1933.

Wide belts are usually employed in live roller conveyors of this type to transmit power to the load carrying rollers but due to irregularities in the conveyor frame members, several rollers engaging the belts and irregularities in the belts themselves, the proper central or other predetermined path tracking of the belts along the conveyors presents a problem. If the belt is allowed to deviate from the predetermined path or to track toward one side or the other of the conveyor, the edges of the belt will rub against other fixed or movable parts with resulting substantial loss of power and rapid wear of the belts. This difficulty may be overcome by providing means for adjusting the angle of the several actuator rollers relative to the direction of travel of the belt or in relation to the side frame members which support the load carrying rollers.

An object of this invention is to provide in a live roller conveyor of the class described, simplified and more readily adjustable means for changing the angles of the belt actuator rollers relative to the direction of travel of the belts whereby the elongated reach of the belt in contact with the load supporting rollers may be caused to track properly. By the present invention I reduce both the cost of the conveyor and cost of installation, very substantially.

It is common practice to support the driving reaches of live roller conveyors on rollers which are mounted at a fixed elevation so that such rollers retain the belt in driving contact with the load supporting rollers. Means for adjusting the angular position of each of the several actuator rollers to effect the desired tracking of the belt in relation to the load supporting rollers are also known. In other types of prior conveyors the actuator rollers are adjustable to and from the belt to vary the pressure of the belt on the load carrying rollers. It has been found, however, that the cost of providing known individual adjusting means for the actuator rollers is high and that with convention live roller conveyors the amount of time required to adjust the tracking of the belt for each installation is also high. By the present invention I greatly reduce these costs.

Referring to the accompanying drawings which illustrate, by way of example and not for the purpose of limitation, two modifications of my invention:

Figure 1:
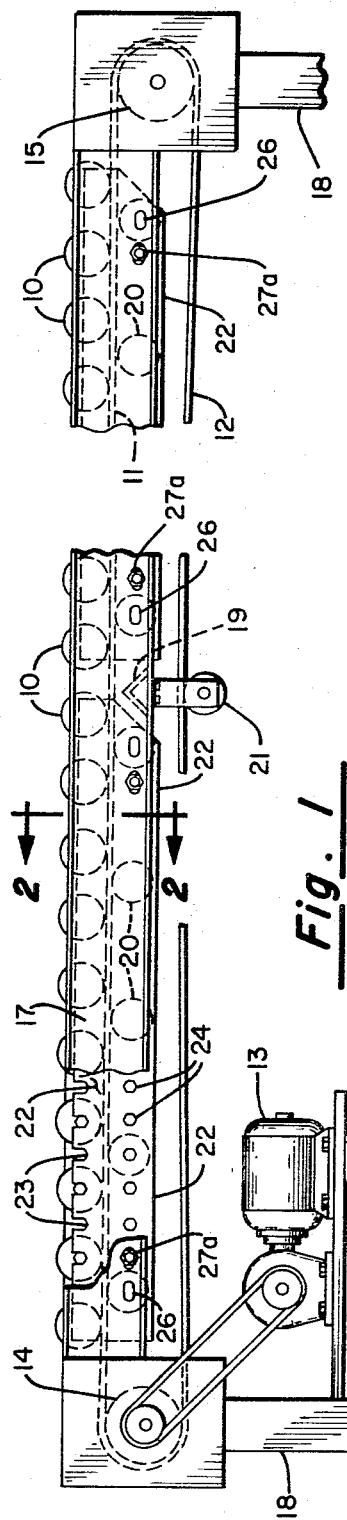
FIGURE 1 is a side elevational view showing a live roller conveyor embodying one modification of the invention.
Figure 2:
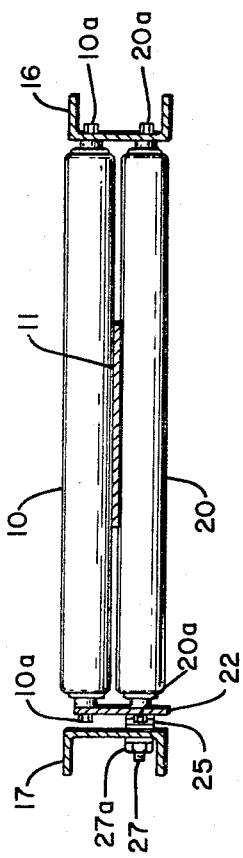
FIG. 2 is a cross sectional view taken on the line 2—2 of FIG. 1.
Figure 3:
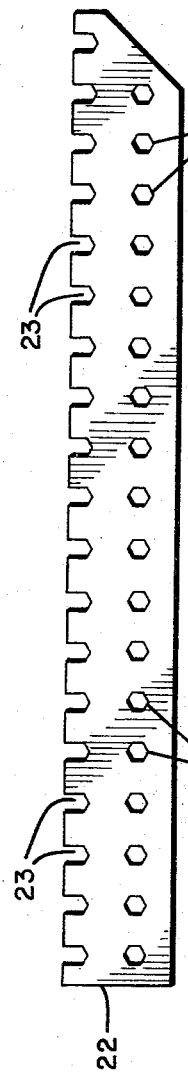
FIG. 3 is a side elevational view of one of the adjustable bars for supporting the rollers at one side of the conveyor shown in FIGS. 1 and 2.

In the drawings a multiplicity of load supporting rollers are indicated at 10, a belt for rotating the rollers is shown with an upper reach 11 engaging the lower peripheries of the rollers 10 and a return or idling reach of the belt is indicated at 12. An electric motor 13 is operatively connected in conventional manner to a drum 14 upon which the belt is trained and the belt is guided on a drum 15 mounted at the opposite end of the conveyor frame. A supporting frame for the conveyor comprises parallel side frame members, indicated at 16 and 17 respectively, legs 18 and cross frame members 19 which rigidly retain the members 16 and 17 in parallel spaced relation one to the other.

Actuator rollers indicated generally by the numeral 20 are arranged to support the upper reach 11 of the belt in driving engagement with the load carrying rollers 10 and the return or idling reach 12 of the belt is supported at intervals on idler rollers 21 mounted on suitable brackets depending from the side frame members 17 and 18. The several rollers 10 and 20 are of the anti-friction bearing type, and each is provided with an axially disposed supporting shaft which projects from the anti-friction bearings at both ends and is adapted to be supported on the side frame members 16 and 17. The axial shafts for the rollers 10 are indicated at 10a, and those for the rollers 20 at 20a in the several views.

Referring to the modification of the invention shown in FIGS. 1–3, 7 and 8, the side frame member 16 is formed with a multiplicity of openings properly spaced to receive the projecting end portions of the shafts 10a and 20a. End portions of the shafts 10a and 20a adjacent to the side frame member 17 are supported on an adjustable bar indicated generally at 22. Vertically spaced horizontal rows of openings 23 and 24 are formed in the barr 22 to receive end portions of the shafts 10a and 20a respectively. As shown, these shafts are hexagonal in cross sectional shape, the openings 23 and 24 are adapted to fit the shafts and prevent them from turning. Each of the openings 23 is vertically elongated and is open at the upper edge of the bar 22 so that the end portions of the several shafts 10a which normally rest in the openings 23 may be moved upwardly to free the shafts from the adjustable bar 22 when any foreign body or extraneous matter passes between the belt reach 11 and one or more of the rollers 10. This safety feature is particularly adapted for conveyors in situations where there is a possibility that an operator may accidentally insert a hand or catch his clothing between the roller 10 and belt. The openings 24 of the lower row are adapted to receive end portions of the shafts 20a supporting the rollers 20. As shown, each of the adjustable bars 22 is adapted to support one end of the rollers 20 of a group and is mounted in spaced parallel relation to the inner surface of the side frame members 17 by threaded members 27 and spacers 25.

To provide for longitudinal adjustment of the bars 22 relative to the side frame members 17, the latter are formed with pairs of horizontally elongated slots 26 adapted to receive threaded members 27 which when tightened secure the bar in selected positions. The threaded members may each comprise a bolt and nut 27a or a screw in the nature of a machine screw having a threaded connection with the bar 22 and having one of the spacers 25 confined between the bar 22 and side frame member 17.

Figure 4:
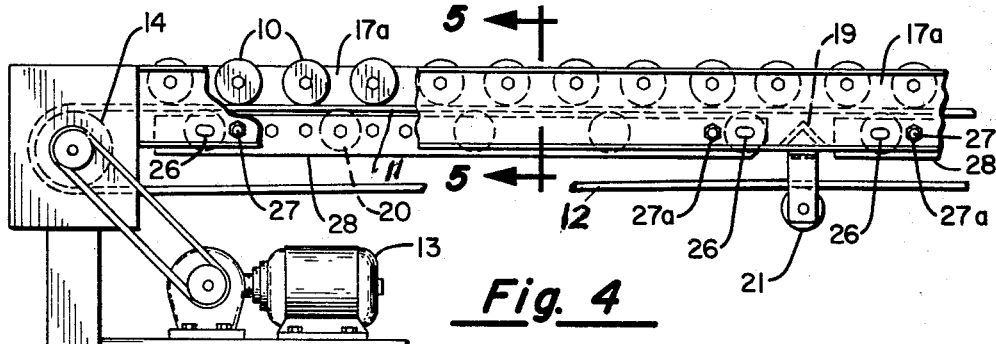
FIG. 4 is a fragmentary side elevational view illustrating a modified form of the invention.
Figure 5:
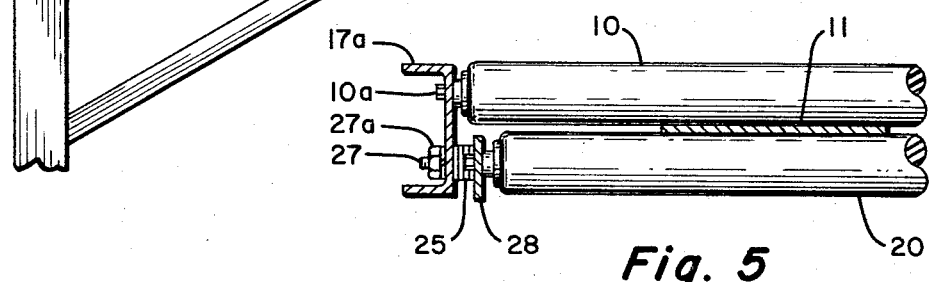
FIG. 5 is a fragmentary cross sectional view taken on the line 5—5 of FIG. 4.
Figure 6:
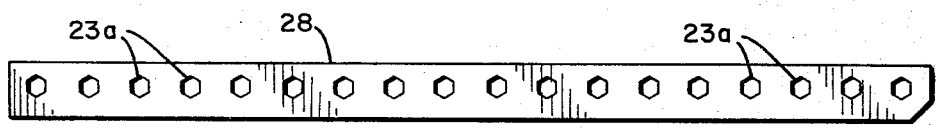
FIG. 6 is a side elevational view showing the adjustable bar support at one side of the group of actuator rollers such as those shown in FIGS. 4 and 5.
Figure 7:
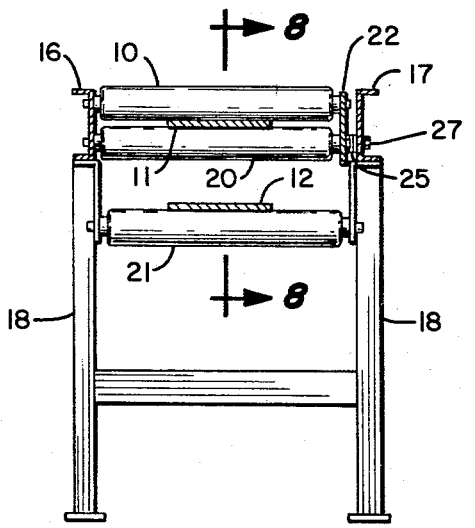
FIG. 7 is a somewhat schematic cross sectional view showing on a smaller scale a live roller conveyor embodying my invention.
Figure 8:
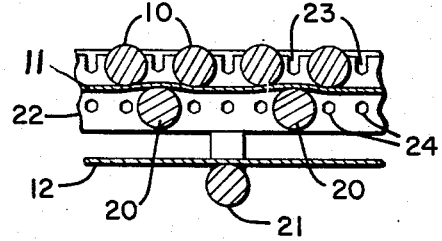
FIG. 8 is a fragmentary sectional view taken on the line 8—8 of FIG. 7.

According to the modification of the invention shown in FIGS. 4, 5 and 6, only the actuator rollers 20 are supported at one end on an adjustable bar 28 which is secured to the side frame member 17a by threaded members 27. These members 27 and spacers 25 are employed to adjustably secure the bar 28 to the side frame member 17a. Further, according to this modification, the load supporting rollers 10 have axially disposed supporting shafts 10a, the end portions of which fit in openings in both of the side frame members 16 and 17a. As best shown in FIG. 6, the adjustable bar 28 is formed with a multiplicity of regularly spaced openings 23a to receive end portions of the shafts 20a of a group of actuator rollers 20. The spacing of the openings 23a is such as to locate the end portions of the shafts 20a of the several rollers 20 wherever the latter may be requried. For example, as shown in FIG. 4, only one roller 20 is required for each pair of rollers 10. Thus, in the assembled conveyor, a number of unoccupied openings 23a are available to receive threaded members 27 in slots 26 in the frame member 17a for securing the bar in selected positions.

Likewise, in the modification shown in FIGS. 1–3, 7 and 8 selected openings 24 are utilized to receive threaded members 27 near each end of the bar 22 to secure the latter to the side frame member 17 where the horizontally elongated slots 26 are located. It will be evident that the several actuator rollers 20 are located approximately midway between and at a lower level than the load carrying members 10 of a pair. The belt reach 11 is thus caused to frictionally engage the peripheries of the rollers 10 and 20 over a few degrees of angular wrap, as in conventional live roller conveyors of this type.

The bars 22 and 28 may be formed from flat steel stock of suitable gauge, e.g., from 10 to 14 gauge, depending on the nature and weight of the load units which are to be carried by the conveyor rollers 10.

In operation, to adjust the tracking of the belt along a predetermined path relative to the rollers, a pair of the threaded members 27, one near each end of the bar 22, may be loosened and the bar may be moved longitudinally in one direction or the other. This changes the factory setting of the angle of the rollers relative to the side frame members. At the factory, the threaded members 27 are preferably located centrally relative to the ends of elongated slots 26. Thereafter, the adjustment in the field for any particular installation may be made quickly and easily for an entire group of rollers supported at one end on one of the bars 22. Thus any tendency of the belt to depart from a predetermined or correct path of operation may be offset by appropriate movement of one or more of the bars 22. These bars are preferably about two feet long and may be spaced end to end along one side of a conveyor of any length, as indicated in FIG. 1.

In the operation of the modified adjustable bar 28 shown in FIGS. 4, 5 and 6, proper tracking of the belt may be obtained by securing the bar 28 in any selected position by means of the threaded members 27 which are set in selected positions in the horizontally elongated slots 26 in the side frame member 17a.

It will be evident that the effect of changing the angular positions of a plurality of the actuator rollers 20 relative to the side frame members and direction of travel of the belt is cumulative. Adjustment of the angular positions of a group of rollers, consisting of any desired number, is not only most effective but is also economical in the consumption of time required to properly install each conveyor in the field where skilled installation mechanics are employed to obtain efficient operation of live roller conveyors.

I claim:
1. In a live roller conveyor of the type wherein articles to be conveyed are carried by a multiplicity of load supporting rollers which are rotated by frictional engagement with a power driven endless belt, actuating rollers supporting the belt in driving engagement with the peripheries of said load supporting rollers, a rigid frame including first and second spaced parallel side frame members, each of said rollers having an axially disposed supporting shaft which is supported at a fixed elevation at one end of said first side frame member, the improvements which comprise an elongated flat bar disposed parallel to said second side frame member for supporting the second end of a plurality of said shafts for supporting actuator rollers of a group, said bar being formed with openings spaced therealong to receive end portions of the shafts supporting said group of actuator rollers, and means for securing said bar at a predetermined fixed elevation and spaced inwardly from said second side frame member and in variously adjusted positions longitudinally of said second side frame member whereby to adjust the angular positions of the rollers of said group relative to said second side frame member, the end portions of said axial shafts supporting said group of actuator rollers projecting from said bar toward said second side frame member.

2. In a live roller conveyor of the type wherein articles to be conveyed are carried by a multiplicity of load supporting rollers which are rotated by frictional engagement with a power driven endless belt, actuating rollers supporting the belt in driving engagement with the peripheries of said load supporting rollers, a rigid frame including first and second spaced parallel side frame members, each of said rollers having an axially disposed supporting shaft which is supported at a fixed elevation at one end on said first side frame member, the improvements which comprise; an elongated bar for supporting the second end of a plurality of said shafts for supporting actuator rollers of a group, said bar being formed with openings spaced thereon to receive end portions of the shafts supporting said group of actuator rollers, said second side frame member being formed with a plurality of substantially horizontally elongated slots, and a plurality of threaded members fitting in said slots and attached to said bar for securing said bar at a predetermined fixed elevation on said second side frame member and in variously adjusted positions longitudinally of said second side frame member whereby to adjust the angular position of the rollers of said group relative to said second side frame member.

3. A live roller conveyor in accordance with claim 1 in which said second side frame member is formed with a plurality of substantially horizontally elongated slots, and said means for securing said bar to said second side frame member comprise threaded members fitting in said slots and adapted to secure said bar in variously adjusted positions along said second side frame member.

References Cited
UNITED STATES PATENTS

| | | | |
|---|---|---|---|
| 1,903,732 | 4/1933 | Walter | 198—127 |
| 2,751,067 | 6/1956 | Nicholson | 198—202 |
| 3,035,683 | 5/1962 | Bishop | 198—127 |

ANDRES H. NIELSEN, *Primary Examiner.*

RICHARD E. AEGERTER, EVON C. BLUNK,
*Examiners.*